US012602127B2

(12) United States Patent
Menashof et al.

(10) Patent No.: US 12,602,127 B2
(45) Date of Patent: Apr. 14, 2026

(54) VIRTUALLY DIVIDED INPUT TRACKPAD

(71) Applicant: Microsoft Technology Licensing, LLC, Redmond, WA (US)

(72) Inventors: Roei Shlomo Menashof, Netanya (IL); Ariel Kerner, Herzliya (IL); Oren Istrin, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/742,557

(22) Filed: Jun. 13, 2024

(65) Prior Publication Data

US 2025/0383731 A1     Dec. 18, 2025

(51) Int. Cl.
*G06F 3/041* (2006.01)
*G06F 3/01* (2006.01)

(52) U.S. Cl.
CPC ............ *G06F 3/0416* (2013.01); *G06F 3/016* (2013.01); *G06F 2203/04104* (2013.01); *G06F 2203/04106* (2013.01)

(58) Field of Classification Search
None
See application file for complete search history.

(56) References Cited

U.S. PATENT DOCUMENTS

| | | |
|---|---|---|
| 6,429,846 B2 | 8/2002 | Rosenberg |
| 8,265,688 B2 | 9/2012 | Hamadene |
| 8,471,822 B2 | 6/2013 | Lightenberg |
| 9,417,754 B2 | 8/2016 | Smith |
| 10,795,463 B2 | 10/2020 | Cherney |
| 2014/0002339 A1 | 1/2014 | Guard |
| 2016/0034171 A1* | 2/2016 | Jerie ................... G06F 3/04845 715/863 |
| 2016/0349989 A1 | 12/2016 | Yu et al. |
| 2019/0250666 A1 | 8/2019 | Klein |
| 2020/0125191 A1* | 4/2020 | Cherney ............... G06F 3/0484 |
| 2020/0183580 A1* | 6/2020 | Bertrand ............. G06F 3/04845 |
| 2024/0134517 A1 | 4/2024 | Ding |

OTHER PUBLICATIONS

Russell, et al., "The 7 Best Intuitive Trackpads to Enhance Your Productivity This 2024", accessed on link https://www.bestproducts.com/tech/electronics/g20633756/trackpads-touchpads-for-mac-and-pc/, Jan. 6, 2024, 19 pages.
International Search Report and Written Opinion received for PCT Application No. PCT/US2025/019099, mailed on Sep. 22, 2025, 14 pages.

* cited by examiner

*Primary Examiner* — Stephen T. Reed

(74) *Attorney, Agent, or Firm* — Holzer Patel Drennan

(57) ABSTRACT

The virtually divided input trackpad disclosed herein is designed to provide enhanced ergonomic user interaction with digital interfaces. The virtually divided input trackpad comprises two virtually separated functional areas, each of which may be dedicated to distinct functionalities such as object movement and object rotation. This arrangement allows for simultaneous two-handed operation, offering users an intuitive, efficient, and accessible way of controlling digital environments, which is especially beneficial for users with specific accessibility needs.

19 Claims, 4 Drawing Sheets

400

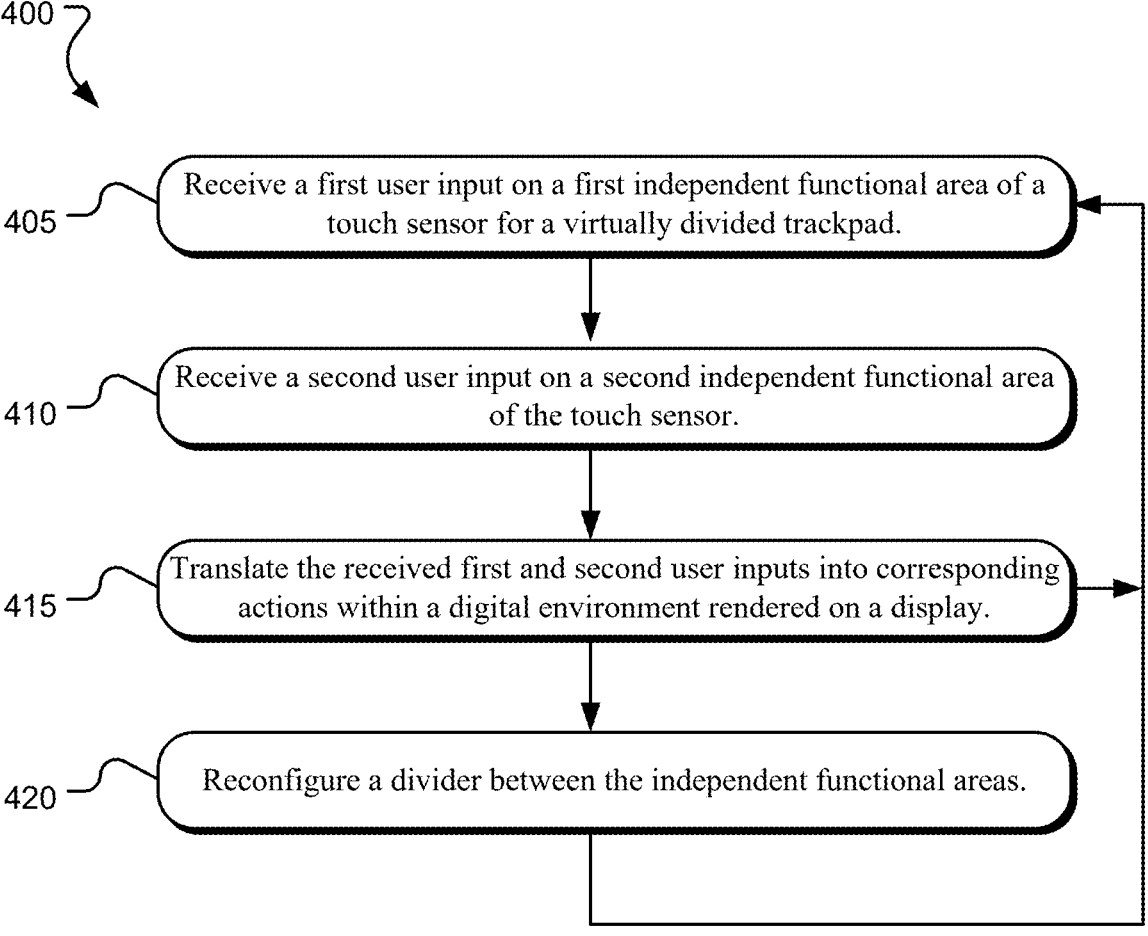

405 — Receive a first user input on a first independent functional area of a touch sensor for a virtually divided trackpad.

410 — Receive a second user input on a second independent functional area of the touch sensor.

415 — Translate the received first and second user inputs into corresponding actions within a digital environment rendered on a display.

420 — Reconfigure a divider between the independent functional areas.

FIG. 4

VIRTUALLY DIVIDED INPUT TRACKPAD

BACKGROUND

A trackpad (also referred to as a touchpad) is a pointing device featuring a tactile sensor that can detect the position and motion of a user's finger(s) on a sensing surface and convert the detected position and motion into a digital output. The digital output of the trackpad is input to an operating system, which in turn displays a position and motion of a cursor corresponding to the user's finger(s) on a display screen of a computing device.

SUMMARY

Implementations described and claimed herein address the problems described herein by providing a virtually divided input trackpad comprising a touch sensor including two or more independent functional areas and a set of software drivers. Each of the software drivers is assigned to one of the independent functional areas of the touch sensor. The software drivers permit separate and simultaneous inputs from the independent functional areas and translate the inputs into corresponding actions within a digital environment rendered on a display.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTION OF THE DRAWINGS

FIG. 4 illustrates example operations for using a virtually divided input trackpad.

DETAILED DESCRIPTION

Mobile computing devices, such as smartphones, tablet computers, and laptop computers often incorporate one or more trackpads as user input devices. Traditional trackpads are single-input devices that interpret touch placements and movements (in combination, gestures) to perform various functions on a user interface. While traditional trackpads offer convenience and intuitive functionality, their one-function-at-a-time approach can limit efficiency and ergonomic comfort, especially in tasks requiring complex inputs such as simultaneous movement and rotation of on-screen objects.

The presently disclosed technology includes a virtually divided trackpad existing on a continuous trackpad surface. For example, one trackpad functional area may be dedicated to controlling the movement of objects within a digital environment, while the other trackpad functional area is dedicated to controlling object rotation or other secondary functions within the digital environment. This dual-functionality approach allows users to perform tasks more efficiently and ergonomically as it aligns with natural hand movements. This further allows a user to simultaneously use both hands and/or reduces the need for complex finger gestures. Additionally, the virtually divided trackpad can be tailored to serve as an accessible device for users with disabilities, offering customizable controls that can be adapted for a variety of motor abilities.

The virtually divided trackpad includes a continuous sensing surface, but with separate input recognition algorithms and haptic feedback mechanisms (if present) assigned and specific to each functional area. Further, each functional area may be capable of detecting standard gestures such as tapping, swiping, and pinching, but is customized for its respective function (e.g., movement or rotation of an object within a digital environment). The presently disclosed technology effectively multiplies the number of available gestures and other controls as compared to a traditional trackpad by the number of virtually divided functional areas.

XYZ coordinates are shown and described below to illustrate directional features of the disclosed technology. Other coordinate systems may also be used with different orientations with similar effects. The descriptions of motion aligned in XYZ coordinate directions that follow are intended to be approximate as an application of force may not be aligned exactly in XYZ coordinate directions, and resisting forces may be not aligned exactly in XYZ coordinate directions. Further, manufacturing tolerances may vary the actual movement of the disclosed technology from XYZ coordinate directions. Thus, all of the following descriptions of movement of the disclosed technology with reference to XYZ coordinate directions or logical directions (e.g., up, down, across) are offered as examples only and intended to be approximate.

Figure 1:
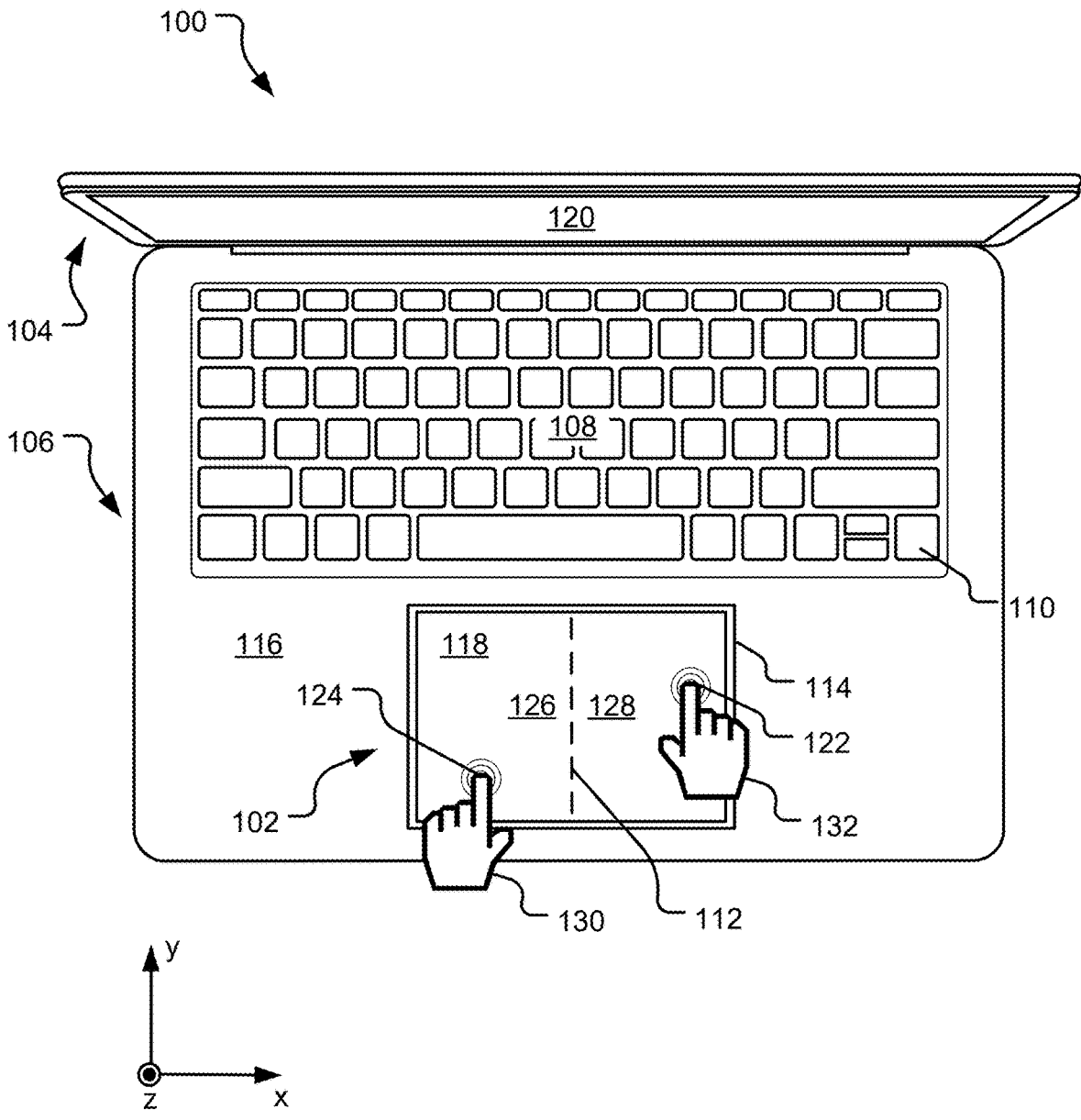
FIG. 1 illustrates a perspective view of a mobile computing device including a virtually divided input trackpad.

FIG. 1 illustrates a perspective view of a mobile computing device 100 including a virtually divided input trackpad 102. The mobile computing device 100 includes a display portion 104 hinged to a keyboard portion 106. The display portion 104 includes a display 120, the keyboard portion 106 includes a keypad 108, and the trackpad 102 is mounted within device chassis (or frame) 116. The keypad 108 contains an array of keys (e.g., key 110) arranged in a predetermined pattern (e.g., QWERTY). Each key within the keypad 108 may be communicatively connected to the mobile computing device 100.

The trackpad 102 (also referred to herein as a touchpad or mousepad) includes at least a printed circuit board assembly (PCBA) with an associated touch sensor 118 (also referred to as a touch glass or simply glass) attached or adhered to the depicted top side of the PCBA. The trackpad 102 is oriented within a receiving aperture 114 in the device chassis 116. The trackpad 102 (converts physical user inputs into corresponding electrical signals that may be interpreted by the mobile computing device 100.

The touch sensor 118 includes a pair of independent functional areas 126, 128 separated by a divider 112. The independent functional areas 126, 128 are capable of separately and independently detecting touch inputs, including standard or customized gestures as applied by a user's hands 130, 132 (or more specifically, one or more of the user's fingers of each of the user's hands 130, 132). While simultaneous use of two hands 130, 132 is contemplated and explicitly described herein, other combinations of user appendages may be used to similar effect (e.g., for a user that is missing or unable to use one or both hands, one or more feet may be used to similar effect). The independent functional areas 126, 128 are technically advantageous in that they enable independent and simultaneous user inputs, which can yield increases in user productivity when using the trackpad 102.

Figure 3:
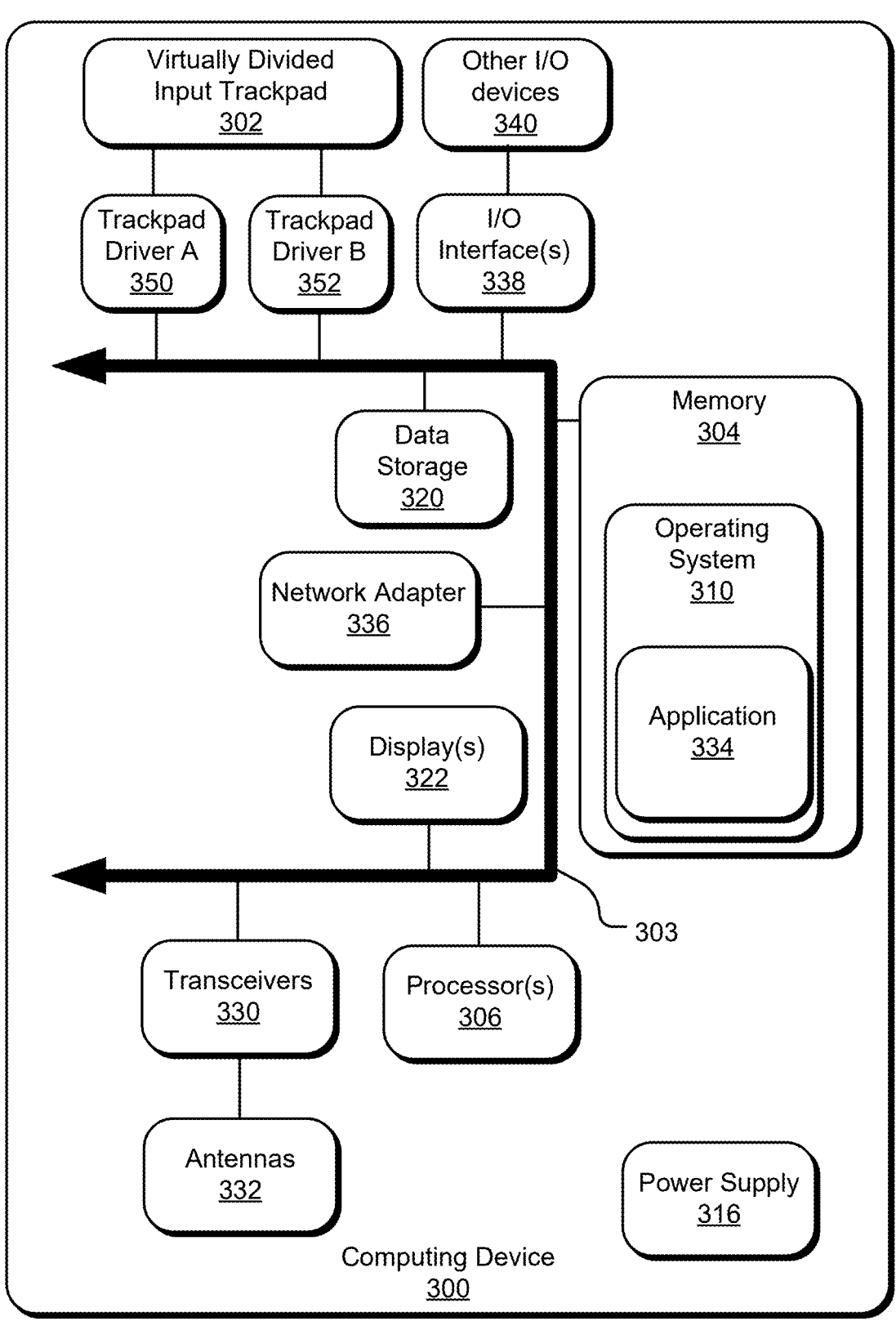
FIG. 3 illustrates example hardware and software that can be useful in implementing the described technology in a computing device.

The independent functional areas 126, 128 may be enabled by a set of separate and independent software drivers (not shown, see e.g., Trackpad Driver A 350 and Trackpad Driver B 352 of FIG. 3), each of which assigned to one of the independent functional areas 126, 128 of the touch sensor 118. The software drivers permit separate and simultaneous inputs from the independent functional areas 126, 128 and translate the inputs into corresponding actions within a digital environment rendered on the display 120.

Some trackpads are mechanically depressible or "clickable" (also referred to as clickpads), which refers to an additional ability to detect a magnitude of force on or displacement of the sensing surface caused by the user's finger(s) and include force/displacement magnitude in the digital output. In the case of a "clickable" trackpad, the touch sensor 118 is capable of physical downward translation in the negative z-direction in response to a user's compressive inputs 122, 124 on the touch sensor 118. If the magnitude of the user's compressive inputs 122, 124 is sufficient to overcome a resisting spring force applied by an underlying spring mechanism, referred to herein as an activation threshold, the user has "clicked" the trackpad 102. When the user releases enough of the compressive inputs 122, 124 to meet a release threshold, the touch sensor 118 rebounds to its original position and is "unclicked." The independent functional areas 126, 128 may be capable of separately and independently registering and discerning clicks registered on the independent functional areas 126, 128 by the user's hands 130, 132.

The trackpad 102 may also include haptic tactile feedback generated by a haptics transducer that generates a brief vibration that mimics traditional tactile feedback of a mechanically depressible trackpad, resulting in a haptic trackpad. An associated operating system may utilize the force/displacement magnitude applied by the user's finger(s) to determine if the user intends to "click" the haptic trackpad in the detected position and with the detected motion of the user's finger(s). Some haptic trackpads combine a limited physical stroke of the trackpad with a haptic response to provide feedback to a user, for example, by indicating that sufficient force has been detected by the trackpad to register a "click," with or without the physical stroke of the trackpad. The independent functional areas 126, 128 may also be capable of separately and simultaneously generating outputs (e.g., haptic feedback) to the user via the user's hands 130, 132.

While two independent functional areas 126, 128 are depicted in FIG. 1 and described specifically herein, any number of independent functional areas is possible using the presently disclosed technology, with the only limit being the practicality of independently operating numerous independent functional areas. Further, the two independent functional areas 126, 128 are depicted in FIG. 1 as side-by-side, with the first independent functional area 126 encompassing a left side of the touch sensor 118 and a second independent functional area 128 encompassing a right side of the touch sensor 118. Such an arrangement may be technically advantageous in that is logically corresponds to a user's left hand and right hand. Other implementations of independent functional areas may be otherwise positioned with reference to one another (e.g., top/bottom, outside perimeter/interior, etc.). These arrangements may correspond to visualizations on the display 120, which may be technically advantageous in that the user can logically correlate areas on the display

120 with the independent functional areas 126, 128 of the trackpad 102, for example. The independent functional areas 126, 128 may also be similarly sized, as illustrated in FIG. 1, or differently sized. As a result, the independent functional areas 126, 128 each include a smaller sensing surface contiguous with a remaining larger sensing surface, input recognition algorithm, and haptic feedback mechanism (if present).

The divider 112 may take a variety of forms and include a variety of features but is it at least a virtual divider defining a transition between the independent functional areas 126, 128. In some implementations, the divider 112 is user-configurable and thus allows the user to modify the space and location occupied by each of the independent functional areas 126, 128. This is technically advantageous in that it allows the user to customize the independent functional areas 126, 128 to match the user's specific use case. The divider 112 may also be software application specific, and thus move or become enabled based on a software application that is running or being actively used on the mobile computing device 100. This is technically advantageous in that the size, location, and even presence of the independent functional areas 126, 128 can be customized for specific software applications, improving user accessibility and intuitive use of the software applications. In other implementations, the virtual divider is fixed in position, for example at a midpoint in the x-direction between the independent functional areas 126, 128, as illustrated in FIG. 1. A virtual divider fixed in position may be technically advantageous in that it is always positioned as expected from a user standpoint, and functional software may be built around the virtual divider's fixed position.

The divider 112 may also be a visual or tactile divider between the independent functional areas 126, 128. In various implementations, this may include a raised area, which could be a solid structure, a row of raised bumps, or a row of lights illuminating the divider 112 through the touch sensor 118. The visual or tactile divider may also be user-configurable or software-specific and thus allows the user to visualize or tactilely detect the space and location occupied by each of the independent functional areas 126, 128. This is technically advantageous in that it allows the user to easily identify and distinguish the independent functional areas 126, 128 particularly when the virtual divider is not necessarily always in the same place.

In some implementations, the visual or tactile divider may be used to drive changes to the virtual divider (e.g., where a tactile divider is user-manipulatable, this may drive changes in location of the virtual divider to match the tactile divider). In other implementations, the virtual divider may be used to drive changes to the visual or tactile divider (e.g., when the virtual divider is moved via software, either responsive to user input or automatically based on the software in user, this may drive a change in a visual divider, such as a row of underlying lights to match the virtual divider). In other implementations, the visual or tactile divider is fixed in position, for example at a midpoint in the x-direction between the independent functional areas 126, 128, as illustrated in FIG. 1. A visual or tactile divider fixed in position may be technically advantageous in that it is always positioned as expected from a user standpoint and may be constructed more robustly than a user-manipulatable divider. The divider 112 is depicted in broken lines in FIG. 1 as the divider 112 may not be visible from an exterior of the mobile computing device 100 (e.g., when the divider 112 is exclusively a virtual divider) and/or may appear different from its depiction in FIG. 1 but is nonetheless shown to illustrate the disclosed technology.

In various implementations, depending upon the computing device type and construction, the device chassis 116 may be a device bucket or mid-frame, which serves as a structural framework for the mobile computing device 100 and a surround for the trackpad 102. In various implementations, the mobile computing device 100 may be a tablet computer, a laptop computer, a personal computer, a gaming device, a smartphone, or any other discrete mobile device that carries out one or more specific sets of arithmetic and/or logical operations. The trackpad 102 may further be applied to vehicles (e.g., automobiles, watercraft, and aircraft), consumer electronics (e.g., cameras, telephones, and home appliances), and industrial or commercial machinery, with or without the mobile computing device 100. In other implementations, the trackpad 102 may be applied to a standalone trackpad or a cover (e.g., a type cover), with or without the mobile computing device 100 connected thereto.

Figure 2:
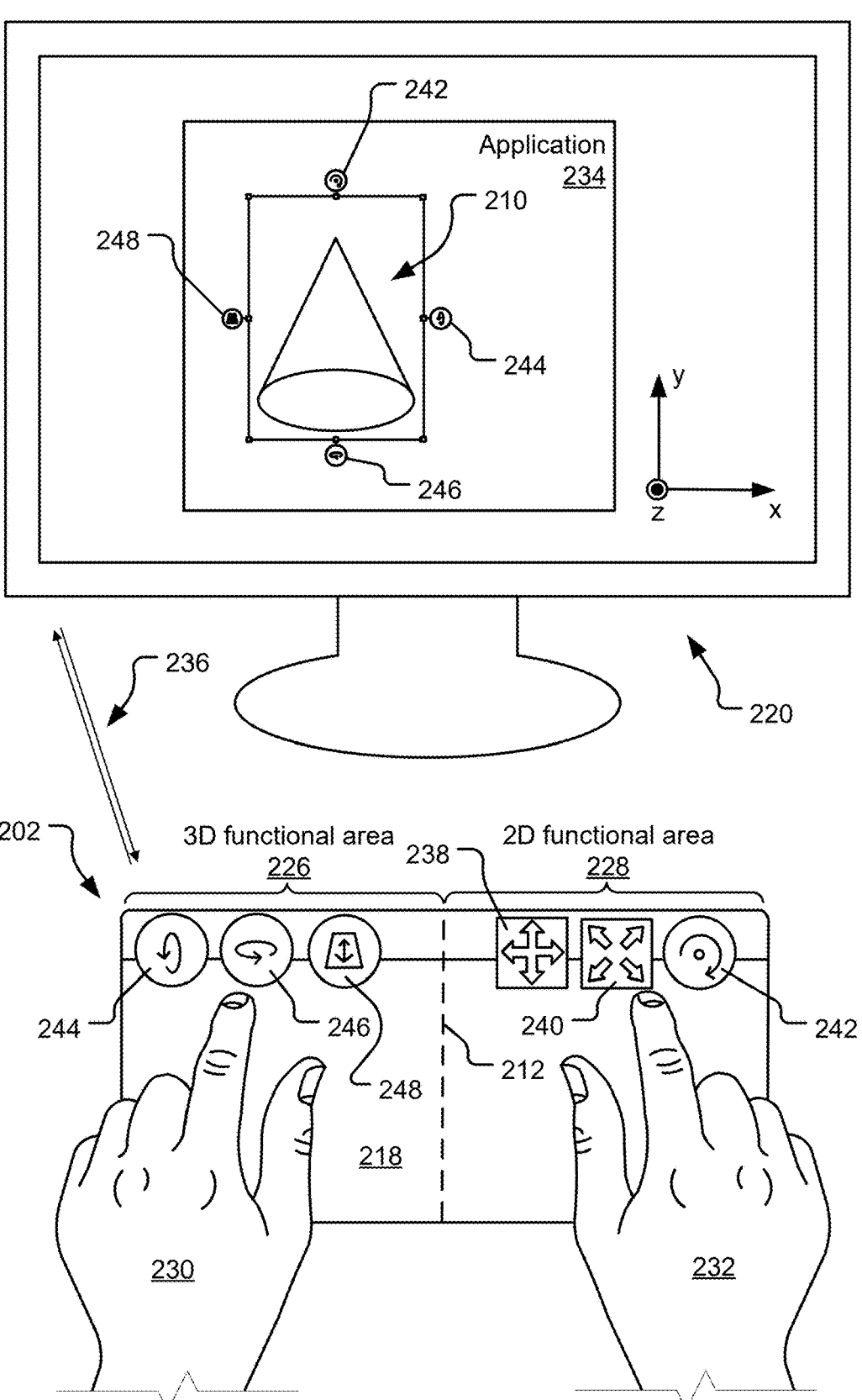
FIG. 2 illustrates a dual input trackpad including a 3D functional area virtually divided from a 2D functional area for manipulating an object within an application visible on a computing device display.

FIG. 2 illustrates a dual input trackpad 202 including a 3D functional area 226 virtually divided from a 2D functional area 228 for manipulating a 3D object 210 within an application 234 visible on a computing device display 220. The display 220 may include or may be wired or wirelessly connected to a computing device (not shown, see e.g., mobile computing device 100 of FIG. 1). The trackpad 202 may be included within the computing device, such as that shown in FIG. 1, or it may be a stand-alone unit that the wired or wirelessly connected to the computing device or the display 220, as illustrated by data connection 236. Regardless, the trackpad 202 converts physical user inputs into corresponding electrical signals that may be interpreted by the computing device and rendered on the display 220. The trackpad 202 includes at least a PCBA with an associated touch sensor 218 attached or adhered to the depicted top side of the PCBA.

In the case of a "clickable" trackpad, the touch sensor 218 is capable of physical downward translation in the negative z-direction in response to a user's compressive inputs on the touch sensor 218. If the magnitude of a compressive input is sufficient to overcome a resisting spring force applied by an underlying spring mechanism, referred to herein as an activation threshold, the user has "clicked" the trackpad 202. When the user releases enough of the compressive input to meet a release threshold, the touch sensor 218 rebounds to its original position and is "unclicked."

The 3D functional area 226 is separated from the 2D functional area 228 by a divider 212. The divider 212 may take a variety of forms and include a variety of features but is it at least a virtual divider defining a transition between the independent functional areas 226, 228. The independent functional areas 226, 228 are capable of separately and independently detecting touch inputs, including standard or customized gestures as applied by a user's hands 230, 232 (or more specifically, one or more of the user's fingers of each of the user's hands 230, 232). While simultaneous use of two hands 230, 232 is contemplated and explicitly described herein, other combinations of user appendages may be used to similar effect (e.g., for a user that is missing or unable to use one or both hands, one or more feet may be used to similar effect).

The independent functional areas 226, 228 may be enabled by a set of separate and independent software drivers (not shown, see e.g., Trackpad Driver A 350 and Trackpad Driver B 352 of FIG. 3), each of which assigned to one of the independent functional areas 226, 228 of the touch sensor 218. The software drivers permit separate and simultaneous inputs from the independent functional areas 226, 228 and translate the inputs into corresponding actions within the application 234 running on the computing device and rendered on the display 220. The independent functional areas 226, 228 may further be capable of separately and independently registering and discerning clicks registered on the touch sensor 218 by the user's hands 230, 232. The independent functional areas 226, 228 may also be capable of separately and simultaneously generating outputs (e.g., haptic feedback) to the user via the user's hands 230, 232. Such separate and potentially simultaneous feedback is technically advantageous in that it can communicate information to the user's hands 230, 232 separately and potentially simultaneously.

The trackpad 202 may be useful for 3D artists to manipulate a digitally rendered 3D object 210 (depicted in FIG. 2 as a cone), as an example. The 3D object 210 is manipulable by the user independently using the 3D functional area 226 and the 2D functional area 228. Specifically, the 2D functional area 228 may recognize certain movements and gestures from the user's right hand 232 to move the object in 2D space, while the 3D functional area 226 may recognize certain movements and gestures from the user's left hand 230 to move the object in 3D space. In combination, use of the independent functional areas 226, 228 is technically advantageous over conventional trackpads in that the 3D object 210 is more easily manipulated without accessing menus or using keystrokes to shift between 2D and 3D space.

As an example, the 2D functional area 228 may be used to achieve PAN functionalities 238. Specifically, the 2D functional area 228 may recognize left and right touch movements using a singular finger from the right hand 232 to yield corresponding movements of the 3D object 210 along the x-axis. Similarly, the 2D functional area 228 may recognize up and down touch movements using the right hand 232 to yield corresponding movements of the 3D object 210 along the y-axis.

Further, the 2D functional area 228 may be used to achieve ZOOM functionalities 240. Specifically, the 2D functional area 228 may recognize a pinching inward gesture using two fingers of the right hand 232 to yield a corresponding reduction of the 3D object 210 along the z-axis. Similarly, the 2D functional area 228 may recognize a pinching outward gesture using two fingers of the right hand 232 to yield a corresponding enlargement of the 3D object 210 along the z-axis.

Further still, the 2D functional area 228 may be used to achieve 2D rotation functionalities 242. Specifically, the 2D functional area 228 may recognize a clockwise gesture using two fingers of the right hand 232 to yield a corresponding clockwise movement of the 3D object 210 in the x-y plane. Similarly, the 2D functional area 228 may recognize a counter-clockwise gesture using two fingers of the right hand 232 to yield a corresponding counter-clockwise movement of the 3D object 210 in the x-y plane.

As a further example, the 3D functional area 226 may be used to achieve 3D rotation functionalities 244. Specifically, the 3D functional area 226 may recognize left and right touch movements using a singular finger from the left hand 230 to yield corresponding counterclockwise and clockwise rotations of the 3D object 210 about the x-axis. Further, the 3D functional area 226 may be used to achieve 3D rotation functionalities 246. Specifically, the 3D functional area 226 may recognize up and down touch movements using a singular finger from the left hand 230 to yield corresponding counterclockwise and clockwise rotations of the 3D object 210 about the y-axis.

Further still, the 3D functional area 226 may be used to achieve ZOOM functionalities 248. Specifically, the 3D functional area 228 may recognize a pinching inward gesture using two fingers of the left hand 230 to yield a corresponding zoom-out of the 3D object 210 along the z-axis. Similarly, the 2D functional area 228 may recognize a pinching outward gesture using two fingers of the left hand 230 to yield a corresponding zoom-in of the 3D object 210 along the z-axis.

The foregoing touch inputs and gestures corresponding to each of the independent functional areas 226, 228 are provided as examples only. Other or additional touch inputs and gestures are contemplated herein. For example, one of the independent functional areas 226, 228 may be directed to controlling the movement of on-screen objects, such as 3D object 210, within a digital environment, while the other of the independent functional areas 226, 228 may be directed to controlling the rotation of the on-screen objects within the digital environment. For further example, one of the independent functional areas 226, 228 may be directed to controlling the digital environment with a user's left hand 230, while the other of the independent functional areas 226, 228 may be directed to controlling the digital environment with a user's right hand 232.

The trackpad 202 may be configurable in various ergonomic layouts to accommodate user preferences and physical requirements. The trackpad 202 may further include accessibility features such as adjustable sensitivity, customizable gesture sets, and the ability to reassign functions based on the user's specific needs. These features make the trackpad 202 adaptable for users with a range of physical abilities, providing an inclusive solution for interacting with technology.

FIG. 3 illustrates example hardware and software that can be useful in implementing the described technology in a computing device 300. The computing devices disclosed herein may be network-connected and/or network-capable devices and may be client devices, such as game consoles, laptops, mobile devices, desktops, tablets, server/cloud devices, internet-of-things devices, electronic accessories, or other electronic computing devices, for example.

The computing device 300 includes a system board upon which a variety of microelectronic components for the device are attached and interconnected via a communication backbone 303. For example, the system board may include one or more processors 306 (e.g., discrete or integrated microelectronic chips and/or separate but integrated processor cores, including but not limited to central processing units (CPUs) and graphic processing units (GPUs)) and at least one memory device 304, which may be integrated into systems or chips of the device. The computing device 300 may also include data storage 320 (e.g., a flash or hard disk drive), one or more display(s) 322, a virtually divided input trackpad 302, and other input/output (I/O) devices 340.

The trackpad 302 converts physical user inputs into corresponding electrical signals that may be interpreted by the computing device 300 and rendered on the display(s) 322. The trackpad 302 includes at least a PCBA with an associated touch sensor (not shown, see e.g., touch sensor 218 of FIG. 2) attached or adhered to the depicted top side of the PCBA. The trackpad 302 is connected to the computing device 300 via a wired or wireless connection and can be integrated with various operating systems (such as operating system 310) and software applications (such as application 334). Trackpad Driver A 350 and Trackpad Driver B 352 interpret inputs from the trackpad 302 and translate them into corresponding actions within a user interface (e.g., the Displays 322). The touch sensor includes independent functional areas (not shown, see e.g., independent functional areas 226, 228 of FIG. 2) capable of separately and independently detecting touch inputs, including standard or customized gestures as applied by a user's hands (not shown, see e.g., user's hands 230, 232 of FIG. 2).

The independent functional areas may be enabled by a set of separate and independent software drivers (e.g., the Trackpad Driver A 350 and the Trackpad Driver B 352) running as firmware within the computing device 300 (as illustrated) or the trackpad 302 or software running on the memory device(s) 304. For example, the trackpad 302 may include specific hardware capable of running the separate and independent software drivers 350, 352 as firmware on the trackpad 302 and output parallel input signals to the computing device 300 via the communication backbone 303. In other implementations, the computing device 300 may include hardware for general operation of the computing device that stores the separate and independent software drivers 350, 352 as software (e.g., via the memory 304 and the data storage 320) and executes the separate and independent software drivers 350, 352 to process input signals received from the trackpad 302 (e.g., via the processor(s) 306).

Each of the independent software drivers is assigned to one of the independent functional areas of the touch sensor, thus enabling independent operation of the functional areas, even though the independent functional areas are implemented using a common touch sensor. The independent software drivers permit separate and simultaneous inputs from the independent functional areas and translate the inputs into corresponding actions within the application 334 running on the computing device 300 and rendered on the display(s) 322.

Other I/O devices 340 may permit a user to enter commands and information (e.g., via a game controller, keyboard, or mouse). These and other input devices may be coupled to the computing device 300 by one or more I/O interfaces 338, such as a serial port interface, parallel port, and/or universal serial bus (USB).

The memory device(s) 304 and/or the data storage 320 may include one or both of volatile memory (e.g., random-access memory (RAM)) and non-volatile memory (e.g., flash memory or magnetic storage). An operating system 310, such as one of the varieties of the Microsoft Windows® operating system resides in the memory device(s) 304 and/or the data storage 320 and is executed by at least one of the processor(s) 306, although other operating systems may be employed. Other software applications, such as application 334 may also be loaded in the memory device(s) 304 and/or the data storage 320 and executed within the operating system 310 by at least one of the processor(s) 306.

The computing device 300 may further include a (or be connected to an external) power supply 316, which is powered by one or more batteries or other power sources and provides power to the computing device 300. The power supply 316 may also be connected to an external power source that overrides or recharges the batteries.

The computing device 300 may further include one or more communication transceivers 330, which may be connected to one or more antenna(s) 332 to provide network connectivity (e.g., mobile phone network, Wi-Fi®, Bluetooth®) to one or more other servers and/or client devices (e.g., mobile devices, desktop computers, or laptop computers) within a wireless network. The computing device 300 may further include a network adapter 336, which is a type of communication interface. The computing device 300 may use the network adapter 336 and any other types of communication devices for establishing connections over a data network, such as a wide-area network (WAN such as the IP Networks disclosed herein) or local-area network (LAN). The network connections shown are exemplary and other communication devices and mechanisms for establishing communications links between computing devices and their respective LAN/WAN network(s) and/or IP Network(s) are contemplated herein.

The computing devices disclosed herein may include a variety of tangible computer-readable storage media (e.g., the memory device(s) and the storage media device(s)) and intangible computer-readable communication signals. Tangible computer-readable storage can be embodied by any available media that can be accessed by the computing devices and includes both volatile and non-volatile storage media, as well as removable and non-removable storage media implemented in any method or technology for storage of information such as computer-readable instructions, data structures, program modules or other data. Tangible computer-readable storage media includes but is not limited to, RAM, read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other tangible medium which can be used to store the desired information and which can be accessed by the computing devices. Tangible computer-readable storage media excludes intangible communications signals.

Intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

FIG. 4 illustrates example operations 400 for using a virtually divided input trackpad. The trackpad converts physical user inputs into corresponding electrical signals that may be interpreted by a computing device and rendered on a display. The trackpad includes at least a PCBA with an associated touch sensor attached or adhered thereto. The trackpad includes two or more independent functional areas that are capable of separately and independently detecting touch inputs. The independent functional areas may be enabled by a set of separate and independent software drivers, each of which is assigned to one of the independent functional areas of the touch sensor. The software drivers are implemented using hardware specific to the trackpad or general to an associated computing device and permit separate and simultaneous inputs from the independent functional areas and translate the inputs into corresponding actions within an application running on the computing device and rendered on the display.

A first receiving operation 405 receives a first user input on a first independent functional area of a touch sensor. The first independent functional area may be any subpart of an overall touch sensor area. A second receiving operation 410 receives a second user input on a second independent functional area of the touch sensor. The second independent functional area may be any other subpart of the overall touch sensor area, which may or may not in combination with the first independent functional area encompass the entire functional area of the touch sensor. The first and second user inputs may be contacts, movements, gestures, or any combination thereof. The first user input and the second user input are received simultaneously by the computing device as the user manipulates the trackpad with two hands. While inputs may not always be simultaneous on the first and second functional areas, the trackpad is capable of such inputs so that the user can use both hands simultaneously to control a user interface.

A translating operation 415 translates the received first and second user inputs into corresponding actions within a digital environment rendered on the display. The translating operation 415 may be generally performed by separate and independent software drivers, each of which is assigned to one of the independent functional areas of the touch sensor. This allows the independent functional areas to function independently, though they are a part of the same touch sensor. This renders the disclosed trackpad technically advantageous over prior trackpads in that the user can manipulate the trackpad simultaneously using both hands as if the trackpad were two separate and independent trackpads. This can speed up user operations, potentially doubling them, as the user can use both hands independently and simultaneously to interreact with the disclosed trackpad.

The independent functional areas are separated from one another by a divider. The divider may take a variety of forms and include a variety of features but is it at least a virtual divider defining a transition between the independent functional areas. In some implementations, the divider is user configurable. In such cases, a reconfiguring operation 420 reconfigures the divider between the independent functional areas. While the divider is at least a virtual divider, a visual or tactile divider may also be included on the trackpad. In some implementations, the visual or tactile divider is re-configurable by the user and drives corresponding changes in the virtual divider. In other implementations, the virtual is re-configurable by the user and drives corresponding changes in the visual or tactile divider. The receiving operations 405, 410, and translating operation 415 may repeat once the divider is reconfigured.

The method or operations making up the presently disclosed technology are referred to variously as operations, steps, objects, or modules. The operations may be performed in any order, adding or omitting operations as desired, unless explicitly claimed otherwise or a specific order is inherently necessitated by the claim language.

Implementations disclosed herein include a computing device including a virtually divided input trackpad comprising a touch sensor including two or more independent functional areas and a set of software drivers. Each of the software drivers is assigned to one of the independent functional areas of the touch sensor, the software drivers to permit separate and simultaneous inputs from the independent functional areas and translate the inputs into corresponding actions within a digital environment rendered on a display.

The computing device including the virtually divided input trackpad may further comprise a virtual divider between the independent functional areas.

The computing device including the virtually divided input trackpad may further comprise a visual or tactile divider between the independent functional areas to align with the virtual divider.

The virtual divider may be user-configurable or software-specific.

The computing device including the virtually divided input trackpad may further comprise a fixed virtual divider between the independent functional areas.

The computing device including the virtually divided input trackpad may further comprise a fixed visual or tactile divider between the independent functional areas to align with the fixed virtual divider.

The software drivers may permit separate and simultaneous outputs to the functional areas.

The separate and simultaneous outputs to the functional areas may include haptic feedback to a user.

Each independent functional area may be assigned a specific input recognition algorithm.

The independent functional areas may include a first independent functional area encompassing a left side of the touch sensor and a second independent functional area encompassing a right side of the touch sensor.

One of the independent functional areas may be for controlling movement of on-screen objects within the digital environment and another of the independent functional areas may be for controlling rotation of the on-screen objects within the digital environment.

One of the independent functional areas may be for controlling the digital environment with a user's left hand and another of the independent functional areas may be for controlling the digital environment with a user's right hand.

The touch sensor and the display may be each to be wired or wirelessly connected to a computing device, and wherein the set of software drivers may be to be executed on the computing device.

The touch sensor and the display may be each integral to or separate from a connected computing device, and wherein the set of software drivers may be executed on the computing device.

The set of software drivers may run on hardware specific to the virtually divided input trackpad or hardware for general operation of the computing device.

Implementations disclosed herein further include a method of using a virtually divided input trackpad comprising receiving a first user input on a first independent functional area of a touch sensor; receiving a second user input on a second independent functional area of the touch sensor, wherein the first user input and the second user input are received simultaneously; and translating the received first and second user inputs into corresponding actions within a digital environment rendered on a display.

The translating operation may be performed by a set of software drivers, each assigned to one of the independent functional areas of the touch sensor.

The method may further comprise reconfiguring a virtual divider between the independent functional areas.

The method may further comprise reconfiguring a visual or tactile divider between the independent functional areas.

The first independent functional area may be for controlling the digital environment with a user's left hand and the second independent functional area may be for controlling the digital environment with a user's right hand.

Implementations disclosed herein further include a virtually divided input trackpad comprising a printed circuit board assembly (PCBA) and attached touch sensor including a first independent functional area encompassing a left side of the touch sensor and a second independent functional area encompassing a right side of the touch sensor, the independent functional areas separated by a virtual divider; and a pair of software drivers. Each of the software drivers is assigned to one of the independent functional areas of the touch sensor, the software drivers to permit separate and simultaneous inputs from the independent functional areas and translate them into corresponding actions within a digital environment rendered on a computing device display.

The above specification, examples, and data provide a complete description of the structure and use of exemplary implementations of the presently disclosed technology. Since many implementations can be made without departing from the spirit and scope of the forgoing disclosure, the scope is defined by the claims hereinafter appended and any equivalents thereto. Furthermore, structural features of the different implementations may be combined in yet another implementation without departing from the recited claims.

What is claimed is:

1. A computing device including a virtually divided input trackpad comprising:
   a touch sensor comprising a single continuous surface including two or more independent functional areas, each configured to detect inputs independently and simultaneously; and
   a set of software drivers, each exclusively assigned to one of the independent functional areas of the touch sensor, the software drivers configured to permit separate and simultaneous inputs from the independent functional areas and translate the inputs into corresponding actions within a digital environment rendered on a display.

2. The computing device including the virtually divided input trackpad of claim 1, further comprising:
   a virtual divider between the independent functional areas.

3. The computing device including the virtually divided input trackpad of claim 2, further comprising:

a visual or tactile divider between the independent functional areas to align with the virtual divider.

4. The computing device including the virtually divided input trackpad of claim 2, wherein the virtual divider is user-configurable or software-specific.

5. The computing device including the virtually divided input trackpad of claim 1, further comprising:

a fixed virtual divider between the independent functional areas.

6. The computing device including the virtually divided input trackpad of claim 5, further comprising:

a fixed visual or tactile divider between the independent functional areas to align with the fixed virtual divider.

7. The computing device including the virtually divided input trackpad of claim 1, wherein the software drivers are to permit separate and simultaneous outputs to the functional areas.

8. The computing device including the virtually divided input trackpad of claim 7, wherein the separate and simultaneous outputs to the functional areas include haptic feedback to a user.

9. The computing device including the virtually divided input trackpad of claim 1, wherein each independent functional area is assigned a specific input recognition algorithm.

10. The computing device including the virtually divided input trackpad of claim 1, wherein the independent functional areas include a first independent functional area encompassing a left side of the touch sensor and a second independent functional area encompassing a right side of the touch sensor.

11. The computing device including the virtually divided input trackpad of claim 1, wherein one of the independent functional areas is for controlling movement of on-screen objects within the digital environment and another of the independent functional areas is for controlling rotation of the on-screen objects within the digital environment.

12. The computing device including the virtually divided input trackpad of claim 1, wherein one of the independent functional areas is for controlling the digital environment with a user's left hand and another of the independent functional areas is for controlling the digital environment with a user's right hand.

13. The computing device including the virtually divided input trackpad of claim 1, wherein the touch sensor and the display are each to be wired or wirelessly connected to a computing device, and wherein the set of software drivers are to be executed on the computing device.

14. The computing device including the virtually divided input trackpad of claim 1, wherein the touch sensor and the display are each integral to or separate from a connected computing device, and wherein the set of software drivers are to be executed on the computing device.

15. The computing device including the virtually divided input trackpad of claim 1, wherein the set of software drivers run on hardware specific to the virtually divided input trackpad or hardware for general operation of the computing device.

16. A method of using a virtually divided input trackpad comprising:

receiving a first user input on a first independent functional area of a touch sensor, the touch sensor comprising a single continuous surface;

receiving a second user input on a second independent functional area of the touch sensor, wherein the first independent functional area and the second independent functional area are configured to receive inputs independently and simultaneously; and translating, by a set of software drivers, the received first and second user inputs into corresponding actions within a digital environment rendered on a display, wherein each software driver is assigned exclusively to a respective one of the first independent functional and the second independent functional area.

17. The method of claim 16, further comprising:

reconfiguring a virtual divider or visual or tactile divider between the independent functional areas.

18. The method of claim 16, wherein the first independent functional area is for controlling the digital environment with a user's left hand and the second independent functional area is for controlling the digital environment with a user's right hand.

19. A virtually divided input trackpad comprising:

a printed circuit board assembly (PCBA) and attached touch sensor having a single continuous surface and including a first independent functional area encompassing a left side of the touch sensor and a second independent functional area encompassing a right side of the touch sensor, each of the first independent functional area and the second independent functional area configured to detect inputs independently and simultaneously, the independent functional areas separated by a virtual divider; and a pair of software drivers, each exclusively assigned to one of the independent functional areas of the touch sensor, the software drivers to permit separate and simultaneous inputs from the independent functional areas and translate them into corresponding actions within a digital environment rendered on a computing device display.

* * * * *